US008253761B2

(12) United States Patent
Kim et al.

(10) Patent No.: US 8,253,761 B2
(45) Date of Patent: Aug. 28, 2012

(54) APPARATUS AND METHOD OF CONTROLLING THREE-DIMENSIONAL MOTION OF GRAPHIC OBJECT

(75) Inventors: Min-chul Kim, Seoul (KR); Young-wan Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1172 days.

(21) Appl. No.: 11/586,545

(22) Filed: Oct. 26, 2006

(65) Prior Publication Data

US 2007/0097114 A1 May 3, 2007

(30) Foreign Application Priority Data

Oct. 26, 2005 (KR) ........................ 10-2005-0101512

(51) Int. Cl.
*G09G 5/00* (2006.01)
(52) U.S. Cl. ...................................................... 345/650
(58) Field of Classification Search ........... 345/649–654
See application file for complete search history.

(56) References Cited

U.S. PATENT DOCUMENTS

| | | | |
|---|---|---|---|
| 5,019,809 A * | 5/1991 | Chen ........................ | 340/815.42 |
| 5,515,486 A | 5/1996 | Amro et al. | |
| 6,157,383 A | 12/2000 | Loop | |
| 6,664,986 B1 * | 12/2003 | Kopelman et al. ............ | 715/849 |
| 2001/0009418 A1 * | 7/2001 | Hiroike et al. ................ | 345/427 |
| 2005/0132305 A1 * | 6/2005 | Guichard et al. ............. | 715/855 |
| 2007/0016025 A1 * | 1/2007 | Arenson et al. ............... | 600/437 |

FOREIGN PATENT DOCUMENTS

| | | |
|---|---|---|
| CN | 1343330 A | 4/2002 |
| JP | 3-250267 A | 11/1991 |
| JP | 7-5980 A | 1/1995 |
| JP | 10-312390 A | 11/1998 |
| JP | 10-312391 A | 11/1998 |
| JP | 2002-288690 A | 10/2002 |
| JP | 2004-259065 | 9/2004 |
| WO | 0055716 A1 | 9/2000 |

* cited by examiner

*Primary Examiner* — Jeffery A Brier
(74) *Attorney, Agent, or Firm* — Sughrue Mion, PLLC

(57) ABSTRACT

An apparatus and method are provided for controlling a movement and rotation of a displayed three-dimensional graphic object using a user input, such as a click or slide on a touch pad. The apparatus for controlling a three-dimensional motion of a graphic object includes a touch pad which receives a user input by a touch, a position determining unit which determines a touch position of the user input on the touch pad, a path detecting unit which detects a slide path and a direction of the slide path based on the determined touch position, and a graphic object control unit which controls a three-dimensional motion of a graphic object according to the detected slide path.

22 Claims, 10 Drawing Sheets

SLIDE PATH

310a

320a

330a

ROTATION DIRECTION

310b

320b

330b

APPARATUS AND METHOD OF CONTROLLING THREE-DIMENSIONAL MOTION OF GRAPHIC OBJECT

CROSS-REFERENCE TO RELATED PATENT APPLICATION

This application claims priority from Korean Patent Application No. 10-2005-101512 filed on Oct. 26, 2005 in the Korean Intellectual Property Office, the disclosure of which is incorporated herein by reference in its entirety.

BACKGROUND OF THE INVENTION

1. Field of the Invention

Apparatuses and methods consistent with the present invention relate to controlling a three-dimensional motion of a graphic object, and more particularly, to controlling a three-dimensional motion of a graphic object that controls the movement and rotation of a displayed three-dimensional graphic object using a user input, such as a click or slide of a touch pad.

2. Description of the Related Art

The invention of the mouse opened an epoch of a graphic user interface (hereinafter, referred to as "GUI"). The Alto computer of Xerox Corporation, an early GUI computer, included a mouse, a graphic window, a network function, and an operating system supporting them. Then, with the development of additional techniques, the Star computer, an early commercial-use system, was developed, to which double-click and multi-window functions were applied.

After the launch of the Star system, Apple introduced the Lisa computer, which initially used a menu bar, a pull-down menu, and so on. The Lisa computer has been commercially successful and known to the general public. Apple later contributed to the popularization of GUI through the Macintosh computer.

Microsoft Corporation participated in manufacturing an application program used with the Macintosh computer, and then, on the basis of the techniques acquired at that time, developed Windows 1.0 as an operating system. Initially, Windows 1.0 was merely a software toolkit. However, with the development of newer techniques, Windows has become the most widely used operating system in the world at present.

With the spread of Windows and the appearance of the Internet, additional GUIs have been developed. Now, GUIs that provide user-friendly and intuitive information in various environments have been developed and used.

The GUI provides convenient use of the computer, and rapid and intuitive information transmission. A user moves a mouse pointer using a mouse and clicks or double-clicks an icon indicated by the mouse pointer so as to instruct a desired operation to the computer. Further, the GUI is used to display information, such as files or other kinds of data. In this case, information can be displayed through a separate dialog window, a help balloon, or the like.

With the development of integration techniques, various portable terminals, including tape players, CD players, pagers, cellular phones, MP3 players, and portable game machines have been developed.

Further, the development of digital multimedia broadcasting (DMB) services is expected to stimulate the demand for portable terminals which provide DMB service, which will likely increase in the future.

Due to the widespread use of portable terminals, GUIs which can attract a user's attention have been developed.

FIG. 1 illustrates display of detailed information which is determined according to the selection of a menu item, according to the related art. FIG. 1 shows a case in which a level of information is determined according to a state of a menu item. That is, when a menu item is in a reduced state 10, only information representing kinds of data, such as file names, is displayed. When a menu item is selected by the user and is shown in an expanded state 20, in addition to the file names, the kinds, sizes, and other additional information of files are displayed.

However, the display shown in FIG. 1 represents data information statically, and thus does not provide visual effects to the user. With such a display, it is difficult to distinguishably display the levels of information.

Liquid crystal displays are widely used as display units in portable terminals. Liquid crystal displays are two-dimensional display devices which generally use a two-dimensional graphic object as a GUI.

Three-dimensional graphic objects may also be implemented and used. Three-dimensional graphic objects are displayed by a two-dimensional display device so as to illustrate motion of a three-dimensional object.

Three-dimensional graphic objects have been mainly used in games or the like, but are now used in menus of portable terminals. That is, the user can control the displayed three-dimensional graphic objects using an input unit, such as buttons, a joystick, or the like, and can thereby select his/her desired item.

However, four direction buttons and joysticks are limited in their ability to control the motions of a three-dimensional graphic object. That is, four direction buttons and joysticks can generally control only two-dimensional motions, and thus the motions of a three-dimensional graphic object are limited. Accordingly, in order to control the motions of a three-dimensional graphic object completely, additional buttons are required.

Additionally, although movement is easily implemented with the use of four direction buttons and joysticks, rotation of a three-dimensional graphic object is not easily implemented.

Therefore, a method and apparatus for implementing movement and rotation of a three-dimensional graphic object by intuitive input of a user is demanded.

SUMMARY OF THE INVENTION

The present invention provides an apparatus and method which control the movement and rotation of a displayed three-dimensional graphic object using a user input, such as a click or slide on a touch pad.

According to an aspect of the present invention, there is provided an apparatus for controlling three-dimensional motion of a graphic object, the apparatus including a touch pad which receives a user input by a touch, a position determining unit which determines a touch position of the user input, a path detecting unit which detects a slide path and a direction of the slide path from the determined touch position, and a graphic object control unit which controls a three-dimensional motion of the graphic object according to the detected slide path.

According to another aspect of the present invention, there is provided a method of controlling a three-dimensional motion of a graphic object, the method including receiving a user input by a touch, determining a touch position of the user input, detecting a slide path and a direction of the slide path from the determined touch position, and controlling a three-dimensional motion of the graphic object according to the detected slide path.

BRIEF DESCRIPTION OF THE DRAWINGS

The above and other aspects of the present invention will become more apparent by the following detailed description of exemplary embodiments thereof with reference to the attached drawings, in which.

DETAILED DESCRIPTION OF EXEMPLARY EMBODIMENTS OF THE INVENTION

Figure 1:
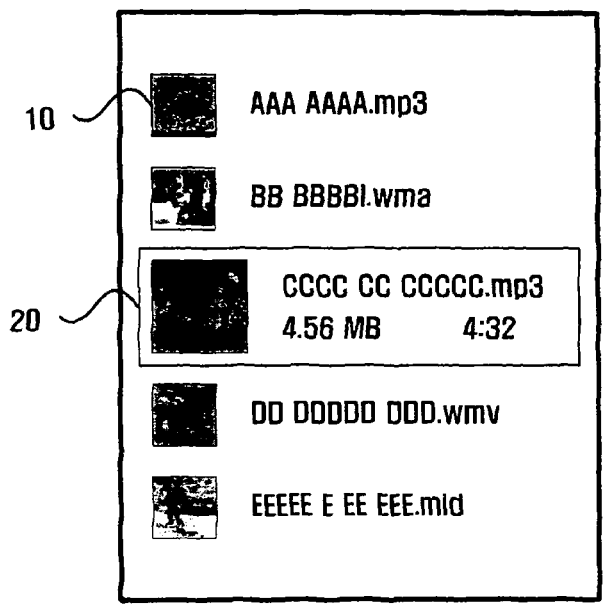
FIG. 1 illustrates a display of detailed information determined according to a selection of a menu item according to the related art.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown.

It will be understood that each block of the flowchart illustrations and combinations of blocks in the flowchart illustrations can be implemented by computer program instructions. These computer program instructions can be provided to a processor of a general purpose computer, special purpose computer, or other programmable data processing apparatus, such that the instructions, which are executed via the processor of the computer or other programmable data processing apparatus, create means for implementing the functions specified in the flowchart block or blocks. These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Each block of the block diagrams may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently, or the blocks may sometimes be executed in reverse order depending upon the functionality involved.

Figure 2:
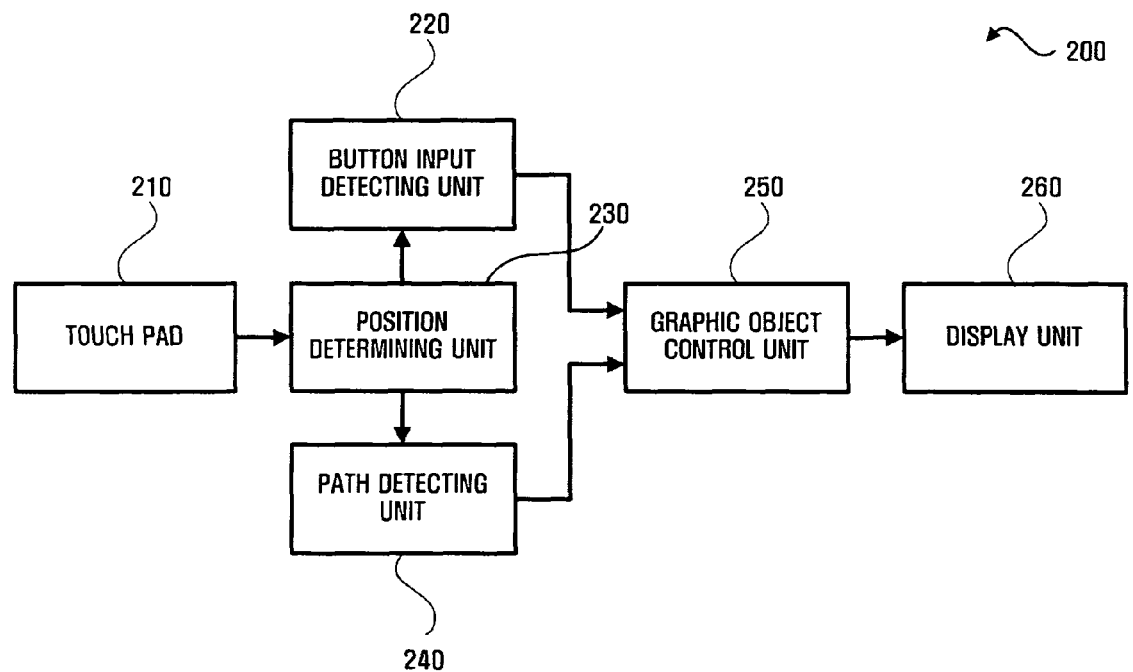
FIG. 2 illustrates an apparatus for controlling three-dimensional motion of a graphic object according to an exemplary embodiment of the present invention.

FIG. 2 illustrates an apparatus for controlling three-dimensional motion of a graphic object according to an exemplary embodiment of the present invention. The apparatus for controlling three-dimensional motion (hereinafter, referred to as a three-dimensional motion control apparatus) 200 has a touch pad 210, a button input detecting unit 220, a position determining unit 230, a path detecting unit 240, a graphic object control unit 250, and a display unit 260.

The touch pad 210 receives a user input by a touch. That is, the touch pad 210 detects movements and pressure of a user's finger that presses down on the touch pad 210.

The touch pad 210 has multiple material layers. An uppermost layer is a layer that the user's finger touches. In a layer disposed below the uppermost layer and separated therefrom by a thin insulator, horizontal and vertical electrode bars are formed in a lattice shape. A layer below the electrode bar layer is a circuit board to which the electrode bar layer is connected. The electrode bar layer is charged with a constant alternating current (AC). If the user's finger nears the electrode bar lattice, the current is cut off, and the cutoff of the current is detected by the circuit board, such that a user input is received.

The touch pad 210 can be divided into six zones, corresponding to six directions, by three-dimensional axes. The zones may be divided in various forms. In order for the user to recognize the borders of the zones, border lines may be displayed on the surface of the touch pad 210.

The position determining unit 230 determines a touch position of the user input. Here, the touch may be simply implemented by a touch and a touch release or a slide after the touch. That is, once the touch by the user's finger is made on the touch pad 210, the position determining unit 230 serves to determine the touch position in real time.

The button input detecting unit 220 detects a button input generated by the touch release after the touch in a specified zone among the six zones on the surface of the touch pad 210 is made. That is, if the user's finger touches a specified position of the touch pad 210 and the touch is released, the position determining unit 230 transmits the touch position and the touch release position to the button input detecting unit 220. Then, the button input detecting unit 220 detects the button input on the basis of the touch position and the touch release position.

The button input detecting unit 220 can determine a difference between the touch position and the touch release position with reference to the border lines of the zones. That is, if the touch position and the touch release position are included within the border lines of a specified zone, the button input detecting unit 220 considers the touch as the button input for that zone. In contrast, if the touch position and the touch release position are in different zones, the button input detecting unit 220 does not consider the touch as the button input.

Meanwhile, the user may input a slide command in a specified zone. Then, even though the touch position and the touch release position are included within the border lines of a specified zone, when a distance between the touch position and the touch release position exceeds a predetermined threshold value, the button input detecting unit 220 will not consider the touch and the touch release as the button input.

The path detecting unit 240 serves to detect a slide path from the touch position determined by the position determining unit 230 in a predetermined direction. That is, the path detecting unit 240 detects a movement position with respect to an initial touch position in real time in a state where the touch is maintained on the touch pad.

The detection of the slide path by the path detecting unit 240 may be performed regardless of the border lines among the zones. That is, if a distance between an initial touch position and a current touch position exceeds a predetermined threshold value, the path detecting unit 240 considers the touch and the touch release as a slide command, and detects the path.

The graphic object control unit 250 controls three-dimensional motion of a graphic object according to the slide path detected by the path detecting unit 240.

Three-dimensional motion includes a rotation of the graphic object according to a slide path when the touch of the user on the touch pad 210 is released. For example, in a case where the slide path when the touch of the user is released is a linear motion in an X axis direction, the graphic object control unit 250 rotates the displayed graphic object around a Y axis or a Z axis.

A plurality of graphic objects may be displayed at the same time. In this case, the three-dimensional motion may include the rotation of a graphic object disposed near a specified graphic object, from among the plurality of graphic objects around the specified graphic object, according to the slide path when the touch of the user on the touch pad 210 is released.

The graphic object control unit 250 may rotate the graphic object in real time. In this case, the three-dimensional motion includes the rotation of the graphic object according to the slide path between two zones corresponding to two directions along one axis. For example, in the touch pad 210 that is divided into zones corresponding to six directions of +X, −X, +Y, −Y, +Z, and −Z, when the initial touch position of the user is −X and the final touch position is +X, the slide path is a line from −X to +X, such that the displayed graphic object rotates around the Y axis or the Z axis.

When a plurality of graphic objects exist, the three-dimensional motion includes a graphic object disposed near a specified graphic object around the specified graphic object according to a slide path between two zones corresponding along an axis.

A detailed description of exemplary rotation of a graphic object will be given below with reference to FIGS. 5A to 5C and FIGS. 6A to 6C.

Three-dimensional motion includes a movement of a graphic object according to a button input detected by the button input detecting unit 220. For example, in a touch pad 300 that is divided into zones corresponding to six directions of +X, −X, +Y, −Y, +Z, and −Z, when the initial touch position of the user is −X and the touch release position is also −X, it represents that the displayed graphic object moves in the −X direction.

When a plurality of graphic objects exist, the three-dimensional motion may include the movement of a focus among the plurality of graphic objects according to the button input detected by the button input detecting unit 220.

A detailed description of the movement of the graphic object will also be given below with reference to FIGS. 7A to 7C and FIGS. 8A to 8C.

The display unit 260 serves to display the graphic object. The display unit 260 is a module having an image display means capable of displaying an input image signal, such as a Cathode Ray Tube (CRT), a Liquid Crystal Display (LCD), a Light-Emitting Diode (LED), an Organic Light-Emitting Diode (OLED), or a Plasma Display Panel (PDP), and serves to display the rotated or moved graphic object.

Figure 3:
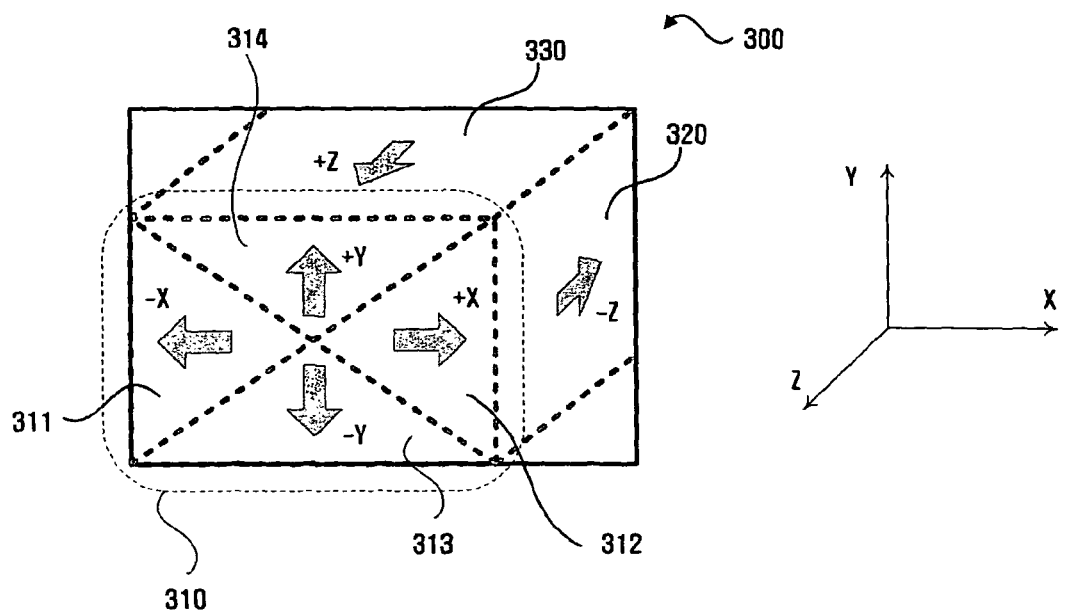
FIG. 3 illustrates a touch pad according to an exemplary embodiment of the present invention.
Figure 3:
Figure 3:
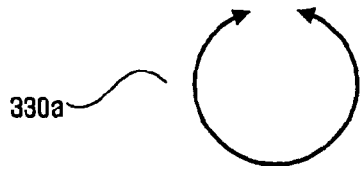
Figure 3:
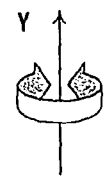
Figure 3:
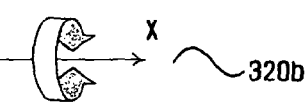
Figure 3:
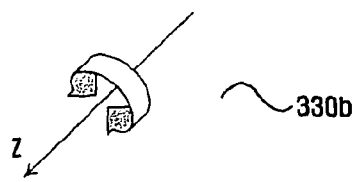

FIG. 3 illustrates a touch pad 300 according to an embodiment of the present invention. In FIG. 3, it can be seen that six zones 311, 312, 313, 314, 320, and 330, corresponding to six directions by three-dimensional axes, are displayed on the surface of the touch pad 300 in a hexahedron shape.

Actually, when the hexahedral three-dimensional object is represented on the two-dimensional touch pad 300, as shown in FIG. 3, three surfaces 310, 320, and 330 can be displayed. Among these, one surface (hereinafter, referred to as a "front surface") 310 is divided into four zones 311, 312, 313, and 314 corresponding to four directions along two axes. The remaining two surfaces (hereinafter, referred to as a "first side surface" and a "second side surface", respectively) 320 and 330 are allocated to two zones 320 and 330, respectively, corresponding to two directions along remaining one axis.

If the touch and the touch release by the user occurs within the six zones 311, 312, 313, 314, 320, and 330, the graphic object control unit 250 moves the displayed graphic object in the corresponding direction. For example, if the touch and the touch release by the user occur in the −X zone 311, the graphic object control unit 250 moves the graphic object in the −X direction. Further, if the touch and the touch release by the user occur in the +Y zone 314, the graphic object control unit 250 moves the graphic object in the +Y direction.

The touch pad 300 receives slide motions 310a, 320a, and 330a by the user, and thus the three-dimensional motion control apparatus rotates the displayed graphic object (310b, 320b, and 330b). For example, when the slide path 310a in the X-axis direction is detected, the graphic object control unit 250 rotates the graphic object around the Y axis (310b). When the slide path 320a in the Y-axis direction is detected, the graphic object control unit 250 rotates the graphic object around the X axis (320b). In addition, when a circular slide path 330a is detected, the graphic object control unit 250 rotates the graphic object around the Z axis (330b). That is, the graphic object control unit 250 applies the three-dimensional motion of the graphic object according to a linear or curved slide path.

Here, when three-dimensional motion of the graphic object is applied, the graphic object control unit 250 detects the input slide path, and applies the three-dimensional motion, that is, the rotation of the graphic object when the touch is released.

The graphic object control unit 250 can apply the three-dimensional motion to a plurality of graphic objects. When the slide motion by the user is input, the graphic object control unit 250 can rotate a graphic object disposed near a specified graphic object, from among the plurality of graphic objects around the specified graphic object.

Figure 4A:
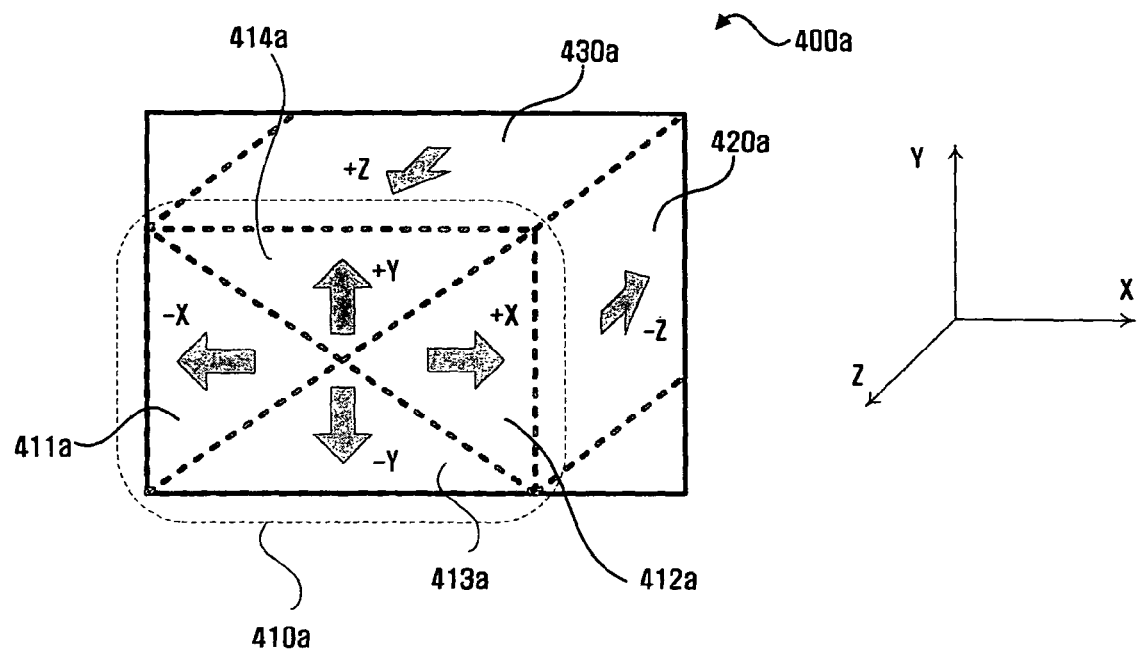
FIGS. 4A and 4B illustrate a touch pad according to another exemplary embodiment of the present invention.
Figure 4B:
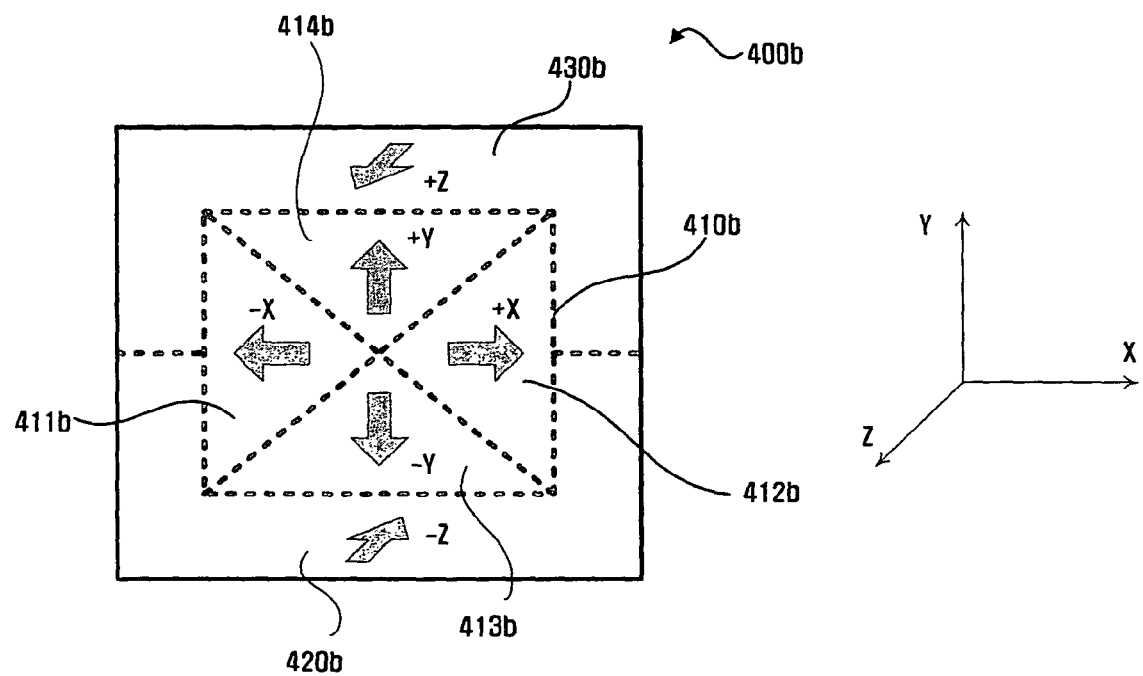

FIGS. 4A and 4B are diagrams showing a touch pad according to another embodiment of the present invention. In FIG. 4A, six zones 411a, 412a, 413a, 414a, 420a, and 430a corresponding to six directions by three-dimensional axes are formed on the surface of the touch pad 400a in a hexahedron shape.

As illustrated in FIG. 3, when a hexahedral three-dimensional object is represented on the two-dimensional touch pad 400a, as shown in the drawings, three surfaces 410a, 420a, and 430a can be displayed. Among these, one surface (the "front surface") 410a is divided into four zones 411a, 412a, 413a, and 414a corresponding to four directions along two axes. The remaining two surfaces (the "first side surface" and the "second side surface", respectively) 420a and 430a are allocated to two zones 420a and 430a corresponding to two directions along the remaining axis.

It is assumed that the horizontal axis and the vertical axis of the front surface are the X axis and the Y axis, respectively. Then, left and right zones on the X axis are allocated to the –X zone 411a and the +X zone 412a, respectively, and upper and lower zones on the Y axis are allocated to the +Y zone 414a and the –Y zone 413a, respectively. In addition, zones corresponding to the first side surface and the second side surface can be allocated to the +Z zone 430a and the –Z zone 420a, respectively.

As such, if the six zones corresponding to the six directions by the three-dimensional axes are allocated, when the touch and the touch release are successively input in the specified zone, the graphic object control unit 250 moves the displayed graphic object in a direction corresponding to the zone. Meanwhile, when a slide command is input in a state where the touch is made, the graphic object control unit 250 rotates the displayed graphic object according to the slide path.

For example, if the touch and the touch release of the user are successively input in the –X zone 411a, the graphic object control unit 250 moves the displayed graphic object in the –X direction. Further, if the touch and the touch release of the user are successively input in the +Y zone 414a, the graphic object control unit 250 moves the displayed graphic object in the +Y direction.

If a slide command from the –X zone 411a to the +X zone 412a is input, the graphic object control unit 250 rotates the displayed graphic object around the Y axis. thief a slide command from the –Z zone 420a to the +Z zone 430a is input, the graphic object control unit 250 rotates the displayed graphic object around the Z axis.

As described above, the individual zones can be divided by border lines, and the border lines can be displayed on the surface of the touch pad 400a. Accordingly, the user can check his/her desired zone according to the border lines, and then can input a command using a touch.

The rotation of the graphic object according to the slide command of the user can have a rotational axis according to the initial touch position.

For example, if a slide command from the –X zone 411a to the +X zone 412a is input, the graphic object control unit 250 rotates the displayed graphic object around the Y axis. In this case, even though the touch position extends to the –Z zone 420a beyond the +X zone 412a, the graphic object control unit 250 does not rotate the graphic object around the Z axis. That is, if the initial touch position is in the –X zone 411a or the +X zone 412a, the graphic object control unit 250 does not rotate the graphic object around the X axis or the Z axis, but rotates the graphic object around the Y axis according to the input slide command.

As such, if the rotational axis is determined according to the initial touch position, the graphic object control unit 250 can rotate the graphic object in real time. That is, before the touch release by the user is made, the rotation of the graphic object according to the slide path can be performed.

FIG. 4B illustrates a touch pad according to another embodiment of the present invention. Referring to FIG. 4B, it can be seen that, on the surface of a touch pad 400b, six zones 411b, 412b, 413b, 414b, 420b, and 430b corresponding to six directions along three-dimensional axes are displayed to be divided into a central surface 410b and marginal surfaces 420b and 430b.

Here, the central surface 410b is divided into four zones 411b, 412b, 413b, and 414b corresponding to four directions along two axes, and the marginal surfaces are vertically divided and allocated to two zones 420b and 430b corresponding to two directions along the remaining axis.

It is assumed that the horizontal axis and the vertical axis of the central surface 410b are the X axis and the Y axis, respectively. Then, left and right zones on the X axis are allocated to the –X zone 411b and the +X zone 412b, respectively, and upper and lower zones on the Y axis are allocated to the +Y zone 414b and the –Y zone 413b, respectively. In addition, the upper and lower marginal surfaces can be allocated to the +Z zone 430b and the –Z zone 420b, respectively.

In a case where the six zones 411b, 412b, 413b, 414b, 420b, and 430b are allocated, the movement and rotation of the graphic object according to the input button command and slide command is as described above, and thus the description thereof will be omitted.

Figure 5A:
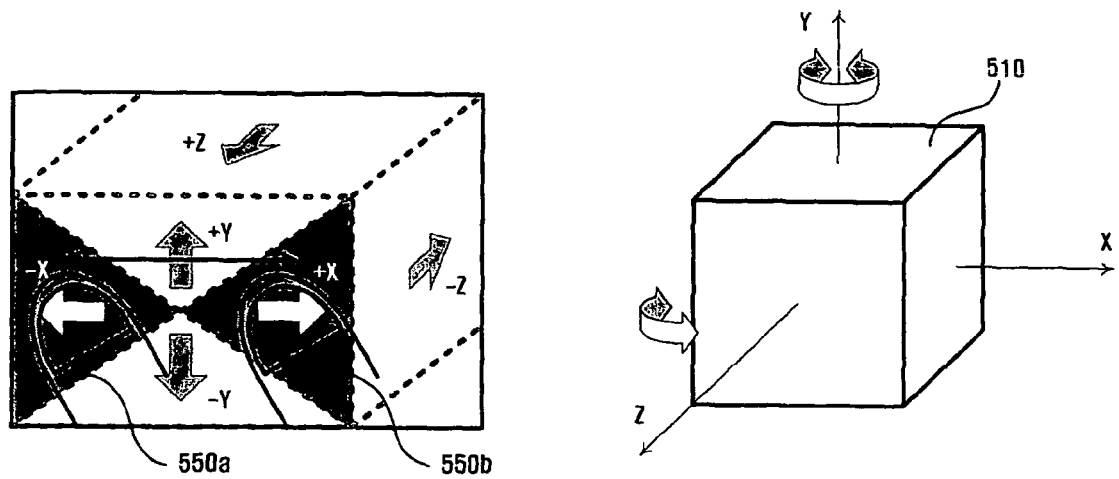
FIGS. 5A to 5C illustrate the rotation of a graphic object according to an exemplary embodiment of the present invention.
Figure 5B:
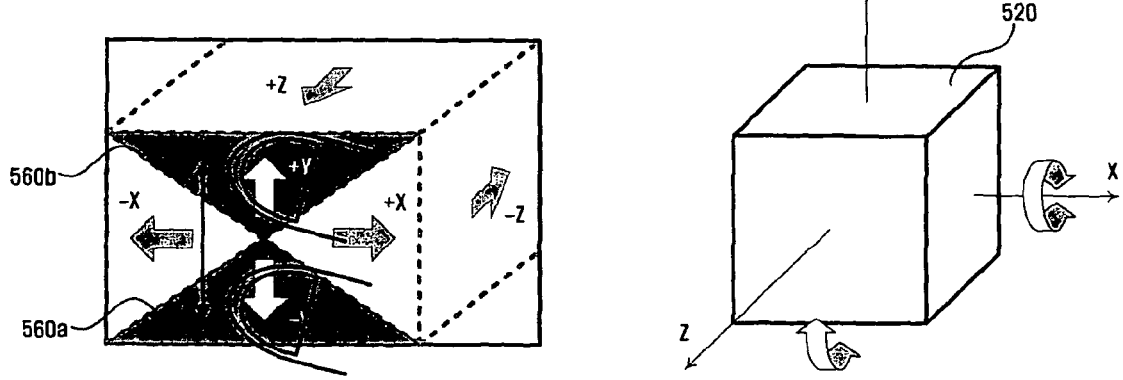
Figure 5C:
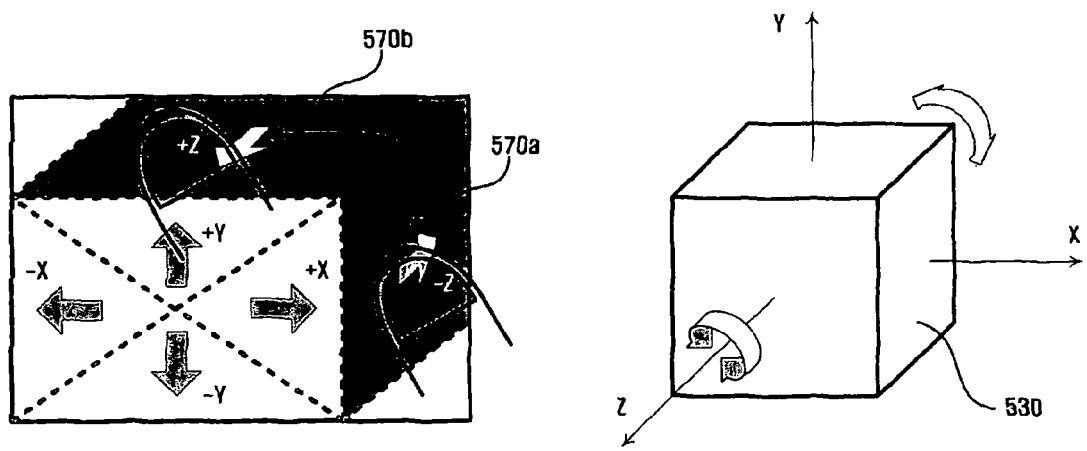

FIG. 5A to 5C show the rotation of a graphic object according to an embodiment of the present invention.

If a slide command in the X-axis direction on the touch pad 300, 400a, or 400b is input, and the touch of the user is released, the graphic object control unit 250 rotates a graphic object 510 around the Y axis.

If a slide command in the Y-axis direction on the touch pad 300, 400a, or 400b is input, and the touch of the user is released, the graphic object control unit 250 rotates a graphic object 520 around the X axis.

If a circular slide command on the touch pad 300, 400a, or 400b is input, and the touch of the user is released, the graphic object control unit 250 rotates a graphic object 530 around the Z axis.

The rotation of the graphic object is performed when the touch release of the user on the touch pad 300, 400a, or 400b is made. When the rotational axis is determined according to the initial touch position, the graphic object control unit 250 can rotate the graphic object in real time. The description thereof will be given with reference to the drawings.

As shown in FIG. 5A, if the slide command from the –X zone 550a to the +X zone 550b on the touch pad 300, 400a, or 400b is input, the graphic object control unit 250 rotates the graphic object 510 around the Y axis.

As shown in FIG. 5B, if the slide command from the –Y zone 560a to the +Y zone 560b on the touch pad 300, 400a, or 400b is input, the graphic object control unit 250 rotates the graphic object 520 around the X axis.

As shown in FIG. 5C, if the slide command from the –Z zone 570a to the +Z zone 570b on the touch pad 300, 400a, or 400b is input, the graphic object control unit 250 rotates the graphic object 530 around the Z axis.

When the graphic object rotates in real time, the rotational axis is determined on the basis of the initial touch position on the touch pad 300, 400a, or 400b. That is, when the initial touch position is in the –X zone 550a or the +X zone 550b on the touch pad 300, 400a, or 400b, the slide command in this zone is recognized as a rotation in the Y-axis direction. Further, when the initial touch position is in the –Y zone 560a or the +Y zone 560b on the touch pad 300, 400a, or 400b, the slide command in this zone is recognized as a rotation in the X-axis direction. In addition, when the initial touch position is in the −Z zone 570a or the +Z zone 570b on the touch pad 300, 400a, or 400b, the slide command in this zone is recognized as a rotation in the Z-axis direction.

When a slide path input by the user passes through different axes, the graphic object control unit 250 can rotate the graphic object while switching the rotational axis.

For example, when the initial touch position is in the −X zone 550a, and the slide path of the user is in the direction of the +X zone 550b, the graphic object rotates around the Y axis. When the slide path of the user passes through the −X zone 550a, the +Y zone 560b, the −Y zone 560a, and the +X zone 550b of the touch pad 300, 400a, or 400b, in the −X zone 550a and the +Y zone 560b, the graphic object rotates around the Y axis, and then rotates around the X axis. Further, in the +Y zone 560b and the −Y zone 560a, the graphic object rotates around the X axis. In addition, in the −Y zone 560a and the +X zone 550b, the graphic object rotates around the X axis and then rotates around the Y axis. That is, the rotational axis is switched at the border lines among the zones.

When the slide path input by the user compositely includes the components of the individual axes, the graphic object control unit 250 can rotate the graphic object around a plurality of rotational axes.

For example, when a slide path is formed in a direction of the border line between the +X zone 550b and the −Y zone 560a with the border line between the −X zone 550a and the +Y zone 560b of the touch pad 300, 400a, or 400b as the initial touch position, the graphic object control unit 250 simultaneously performs the rotation of the graphic object around the Y axis according to the slide path from the −X zone 550a to the +X zone 550b, and the rotation of the graphic object around the X axis according to the slide path from the +Y zone 560b to the −Y zone 560a.

The rotation of the graphic object around one axis and the rotation of the graphic object around a plurality of axes can be set by the user.

Figure 6A:
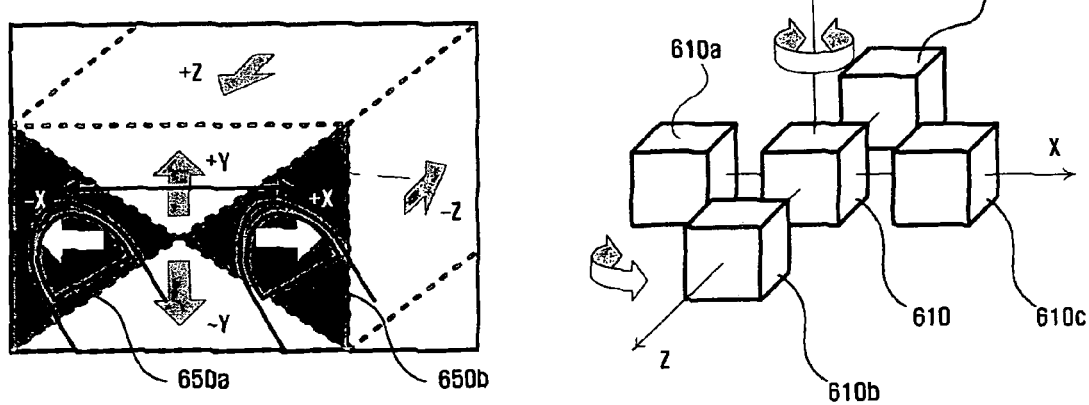
FIGS. 6A through 6C illustrate the rotation of a graphic object according to another exemplary embodiment of the present invention.
Figure 6B:
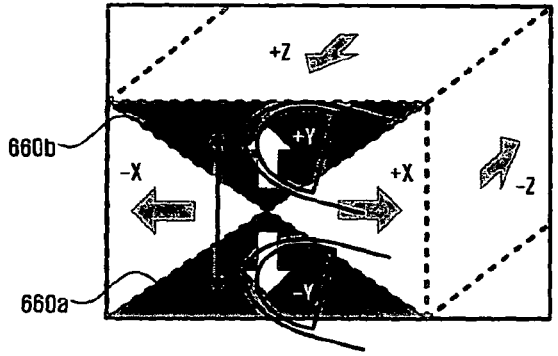
Figure 6B:
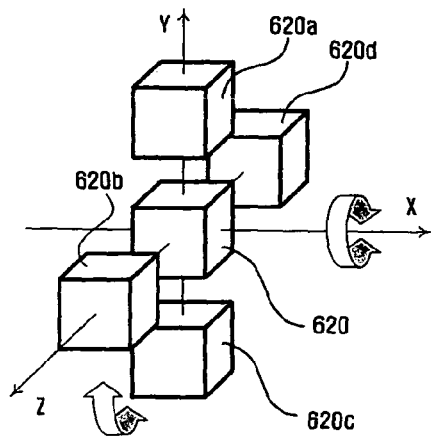
Figure 6C:
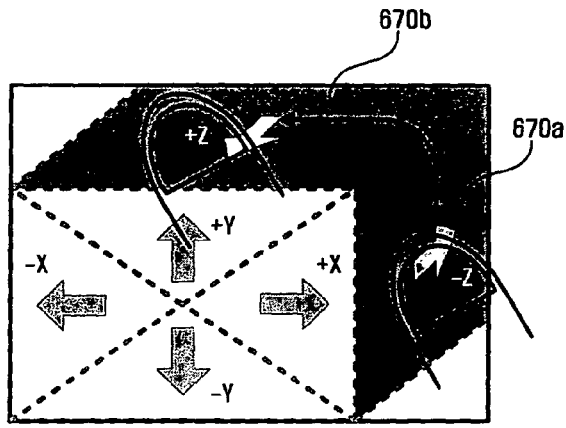
Figure 6C:
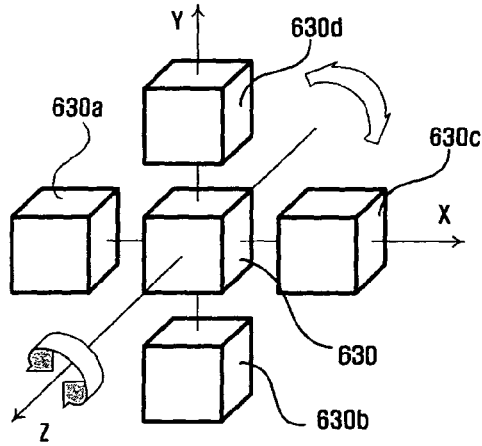

FIGS. 6A to 6C show the rotation of the graphic object according to another embodiment of the present invention.

In FIGS. 5A to 5C, the graphic object rotates around one axis or a plurality of axes among the three-dimensional axes. In FIGS. 6A to 6C, a plurality of graphic objects rotate around one graphic object.

If the slide command in the X-axis direction on the touch pad 300, 400a, or 400b is input, and the touch of the user is released, the graphic object control unit 250 rotates graphic objects 610a, 610b, 610c, and 610d, excluding a graphic object 610 located at the center, around the Y axis.

If the slide command in the Y-axis direction on the touch pad 300, 400a, or 400b is input, and the touch of the user is released, the graphic object control unit 250 rotates graphic objects 620a, 620b, 620c, and 620d, excluding a graphic object 620 located at the center, around the X axis.

In addition, if the circular slide command on the touch pad 300, 400a, or 400b is input, and the touch of the user is released, the graphic object control unit 250 rotates graphic objects 630a, 630b, 630c, and 630d, excluding a graphic object 630 located at the center, around the Z axis.

The rotation of the graphic object is performed when the touch release of the user on the touch pad 300, 400a, or 400b is made. When the rotational axis is determined according to the initial touch position, the graphic object control unit 250 can rotate the graphic object in real time. The description thereof will be given with reference to the drawings.

As shown in FIG. 6A, the slide command from the −X zone 650a to the +X zone 650b of the touch pad 300, 400a, or 400b, the graphic object control unit 250 rotates the graphic objects 610a, 610b, 610c, and 610d, excluding the graphic object 610 located at the center, around the Y axis.

As shown in FIG. 6B, if the slide command from the −Y zone 660a to the +Y zone 660b of the touch pad 300, 400a, or 400b, the graphic object control unit 250 rotates the graphic objects 620a, 620b, 620c, and 620d, excluding the graphic object 620 located at the center, around the X axis.

In addition, as shown in FIG. 6C, if the slide command from the −Z zone 670a to the +Z zone 670b of the touch pad 300, 400a, or 400b, the graphic object control unit 250 rotates the graphic objects 630a, 630b, 630c, and 630d, excluding the graphic object located at the center 630, around the Z axis.

Here, the graphic objects 610a, 610b, 610c, and 610d, 620a, 620b, 620c, and 620d, or 630a, 630b, 630c, and 630d, excluding the graphic object 610, 620, or 630 located at the center, rotate around the graphic object 610, 620, and 630 located at the center.

When the graphic object rotates in real time, the rotation of the plurality of graphic objects or the rotational axis is determined according to the initial touch position of the touch pad 300, 400a, or 400b. That is, when the initial touch position is in the −X zone 650a or the +X zone 650b of the touch pad 300, 400a, or 400b, the slide command thereof is recognized as only the rotation around the Y axis. When the initial touch position is in the −Y zone 660a or the +Y zone 660b of the touch pad 300, 400a, or 400b, the slide command thereof is recognized as only the rotation around the X axis. In addition, when the initial touch position is in the −Z zone 670a or the +Z zone 670b of the touch pad 300, 400a, or 400b, the slide command thereof is recognized as only the rotation around the Z axis.

In addition, when the slide path input by the user passes through different axes, the graphic object control unit 250 can rotate the plurality of graphic objects while switching the rotational axis.

When the slide path input by the user compositely includes the components of the individual axes, the graphic object control unit 250 can rotate the plurality of graphic objects around a plurality of rotational axes.

The rotation of the plurality of graphic objects around one axis and the rotation of the plurality of graphic objects around the plurality of axes can be set by the user.

Figure 7A:
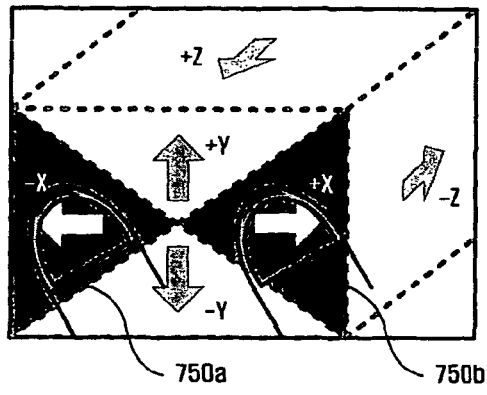
FIGS. 7A to 7C illustrate the movement of a graphic object according to an exemplary embodiment of the present invention.
Figure 7A:
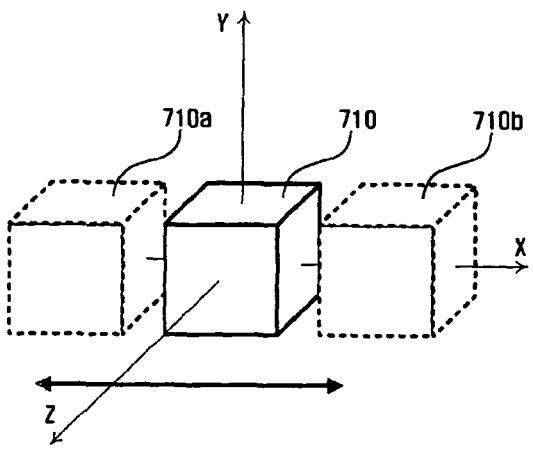
Figure 7B:
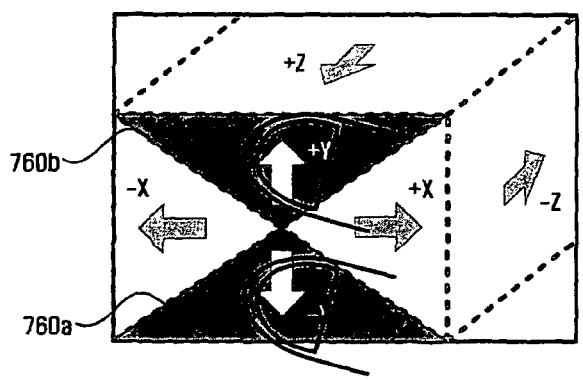
Figure 7B:
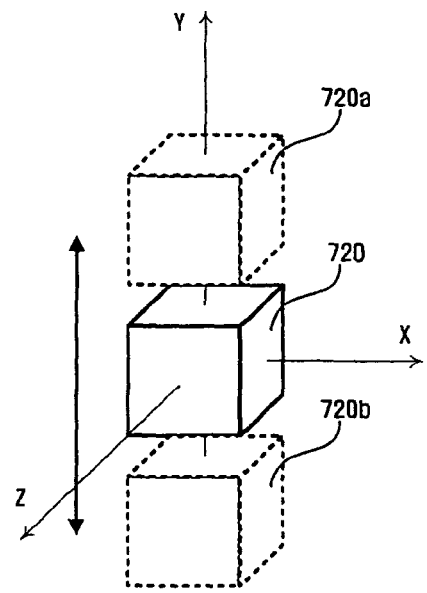
Figure 7C:
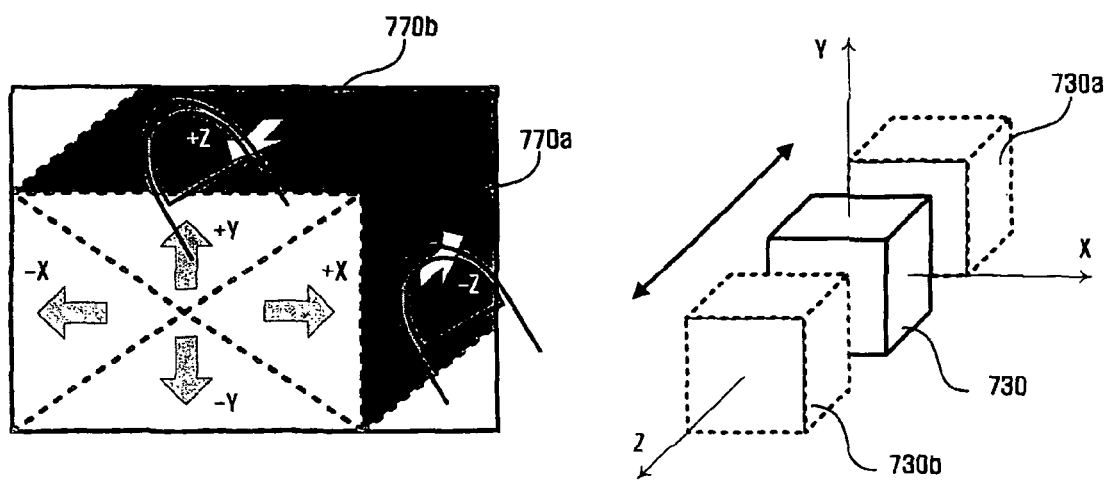

FIGS. 7A to 7C show a movement of the graphic object according to an embodiment of the present invention.

If the six zones corresponding to the six directions by the three-dimensional axes are allocated, and when the touch and the touch release are successively input in a specified zone, the graphic object control unit 250 moves the displayed graphic object in a direction corresponding to the zone.

As shown in FIG. 7A, if the touch and the touch release are input in the −X zone 750a or the +X zone 750b of the touch pad 300, 400a, or 400b, the graphic object control unit 250 moves a graphic object 710 to a left or right side 710a or 710b.

As shown in FIG. 7B, if the touch and touch release are input in the +Y zone 760b or the −Y zone 760a of the touch pad 300, 400a, or 400b, the graphic object control unit 250 moves a graphic object 720 to an upper or lower side 720a or 720b.

In addition, as shown in FIG. 7C, if the touch and the touch release are input in the −Z zone 770a or the +Z zone 770b of the touch pad 300, 400a, or 400b, the graphic object control unit 250 moves a graphic object 730 to a front or rear side 730a or 730b.

The successive input commands of the touch and the touch release are recognized as a button command, and become a move command in a direction displayed on the touch pad 300, 400*a*, or 400*b*, such that the graphic object 710, 720, or 730 is moved.

The graphic object control unit 250 can rotate the graphic object according to a slide command in a specified zone. Accordingly, even though the touch position and the touch release position are included in the specified zone, if the distance between the touch position and the touch release position exceeds the predetermined threshold value, the graphic object control unit 250 may not consider the touch and the touch release as a button input.

That is, if the distance between the initial touch position and the touch release position exceeds a predetermined threshold value, the graphic object control unit 250 considers the touch and the touch release as a slide command, and applies a rotation corresponding to the slide path to the displayed graphic object.

Figure 8A:
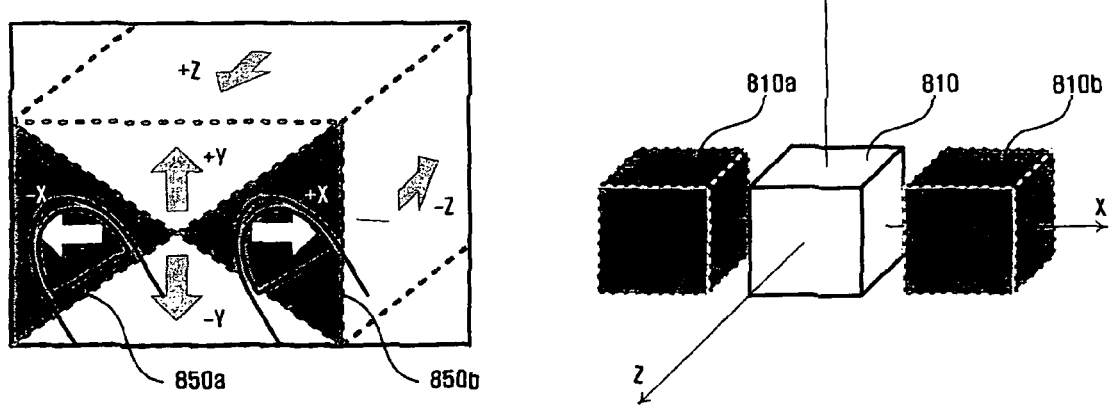
FIGS. 8A to 8C illustrate the movement of a graphic object according to another exemplary embodiment of the present invention.
Figure 8B:
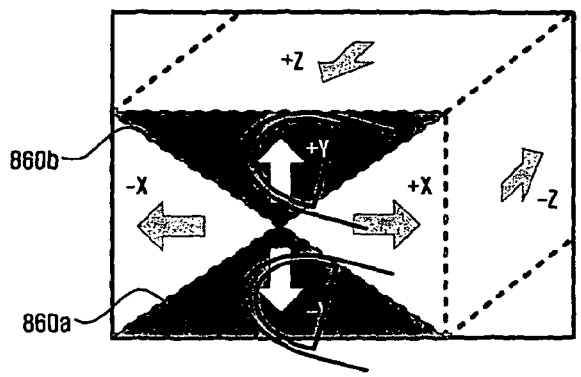
Figure 8B:
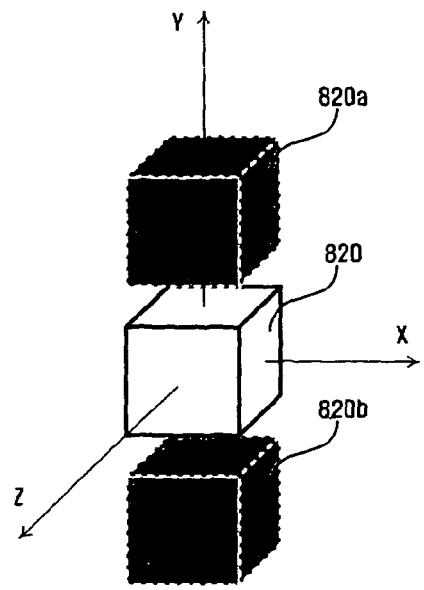
Figure 8C:
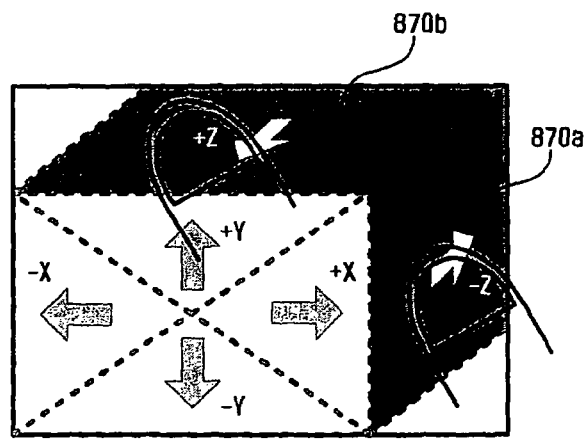
Figure 8C:
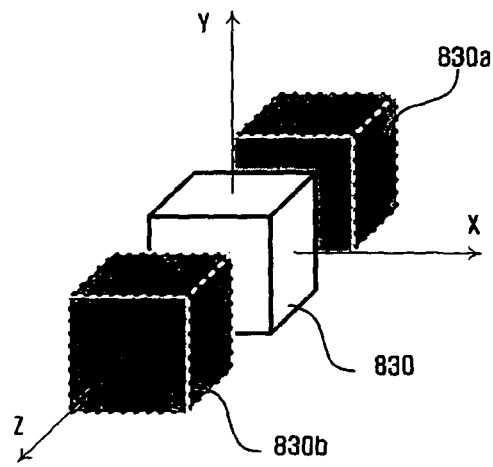

FIGS. 8A to 8C show the movement of a graphic object according to another embodiment of the present invention.

In a case where a plurality of displayed graphic objects exist, and the six zones corresponding to the six directions by the three-dimensional axes are allocated, when the touch and the touch release are successively input in the specified zone, the graphic object control unit 250 moves the focus of the graphic object in a direction corresponding to the zone.

As shown in FIG. 8A, if the touch and the touch release are input in the −X zone 850*a* or the +X zone 850*b* of the touch pad 300, 400*a*, or 400*b*, the graphic object control unit 250 moves the focus 810 of the graphic object to a left or right side 810*a* or 810*b*.

As shown in FIG. 8B, if the touch and the touch release are input in the +Y zone 860*b* or the −Y zone 860*a* of the touch pad 300, 400*a*, or 400*b*, the graphic object control unit 250 moves the focus 820 of the graphic object to an upper or lower side 820*a* or 820*b*.

In addition, as shown in FIG. 8C, if the touch and the touch release are input in the −Z zone 870*a* or the +Z zone 870*b* of the touch pad 300, 400*a*, or 400*b*, the graphic object control unit 250 moves the focus 830 of the graphic object to a front or rear side 830*a* or 830*b*.

The successive input commands of the touch and the touch release are recognized as a button command, and become the move command in the direction displayed on the touch pad 300, 400*a*, or 400*b*, such that the focus 810, 820, or 830 of the graphic object, that is, a cursor is moved.

If the distance between the touch position and the touch release position of the user on the touch pad 300, 400*a*, or 400*b* exceeds the predetermined threshold value, the graphic object control unit 250 does not consider the touch and the touch release as a button input. The same is applied to the focus movement among the plurality of graphic objects.

Figure 9:
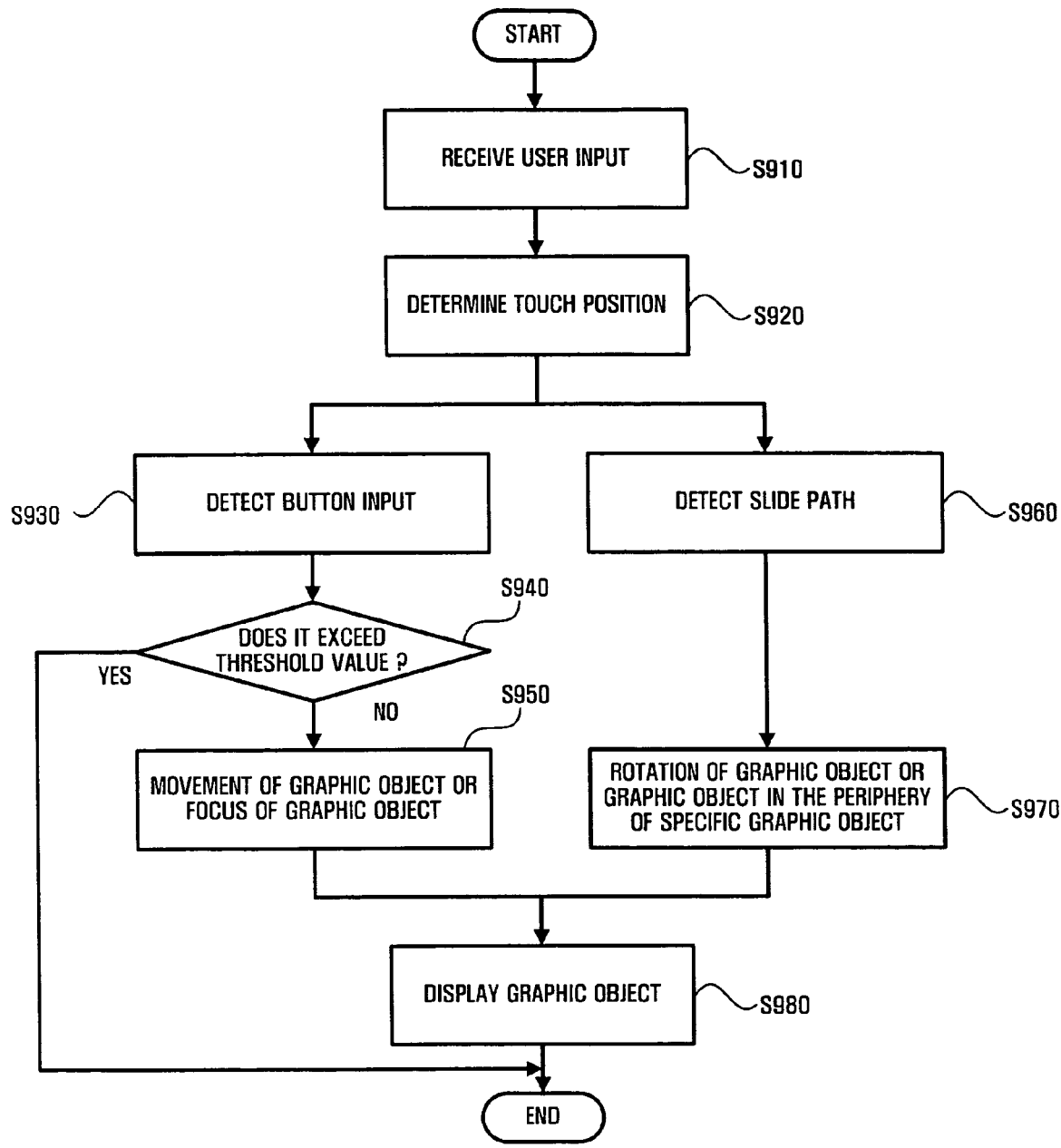
FIG. 9 illustrates a process of controlling three-dimensional motion of a graphic object according to an exemplary embodiment of the present invention.

FIG. 9 is a flow chart showing a process of controlling a three-dimensional motion of a graphic object according to an embodiment of the present invention.

In order to control the three-dimensional motion of the displayed graphic object, the three-dimensional motion control apparatus 200 first receives a user input by a touch (Operation S910). The user input by touch can be received by the touch pad 210. The touch pad 210 can be divided into the six zones corresponding to the six directions by the three-dimensional axes. Here, the division of the zones may be in various forms and are not limited to those specifically described and illustrated with respect to touch pads 300, 400*a*, and 400*b*. In order for the user to recognize the borders among of the zones, the border lines may be displayed on the surface of the touch pad 210.

If a user command by the touch is received by the touch pad 210, the position determining unit 230 determines the touch position of the user input (Operation S920). Once the touch by the user's finger on the touch pad 210 is made, the position determining unit 230 determines the touch position until the touch is released.

The determined position is transmitted to the button input detecting unit 220 and the path detecting unit 240.

Accordingly, the button input detecting unit 220 detects the button input generated by the touch release after the touch in the specified zone among the six zones on the surface of the touch pad 210 using the received touch position (Operation S930).

Here, the button input detecting unit 220 determines whether or not the touch position and the touch release position are included within the border line of the specified zone. If the touch position and the touch release position are included in different zones, the button input detecting unit 220 does not consider the touch and the touch release as the button input. In contrast, if the touch position and the touch release position are included within the border line of the specified zone, the button input detecting unit 220 determines whether the distance between the touch position and the touch release position exceeds the predetermined threshold value (Operation S940).

If the distance between the touch position and the touch release position exceeds the predetermined threshold value, the button input detecting unit 220 does not consider the touch and the touch release as the button input. Meanwhile, if the distance does not exceed the predetermined threshold value, the button input detecting unit 220 considers the touch and the touch release as the button input, and transmits a signal corresponding to the zone to the graphic object control unit 250.

Upon receiving the signal corresponding to the zone, the graphic object control unit 250 moves the displayed graphic object in the corresponding direction (Operation S950). For example, in a touch pad 210 that is divided into the zones corresponding to the six directions of +X, −X, +Y, −Y, +Z, and −Z, when the signal generated by the button input detecting unit 220 corresponds to −X, the graphic object control unit 250 moves the displayed graphic object in the −X direction.

When a plurality of graphic objects exist, the graphic object control unit 250 can move the focus among the graphic objects according to the signal transmitted from the button input detecting unit 220 (Operation S950).

If the position determined by the position determining unit 230 is transmitted to the path detecting unit 240, the path detecting unit 240 detects the slide path in the predetermined direction from the determined touch position (Operation S960). That is, the path detecting unit 240 detects the movement position on the basis of the initial touch position in real time in a state where the touch is kept.

The detected slide path is transmitted to the graphic object control unit 250, and the slide path may be transmitted only when the touch release of the user is released or may be transmitted in real time. The graphic object control unit 250 rotates the displayed graphic object with reference to the received slide path (Operation S970). For example, in a state where the touch is released, when the slide path is in the X-axis direction, the graphic object control unit 250 rotates the displayed graphic object around the Y axis or the Z axis.

In addition, in the touch pad 210 that is divided into the zones corresponding to the six directions of +X, −X, +Y, −Y, +Z, and −Z, when the initial touch position of the user is −X, and the final touch position is +X, the slide path becomes a line from −X to +X. Then, the graphic object control unit 250 can rotate the displayed graphic object around the Y axis or the Z axis.

When a plurality of graphic objects exist, the graphic object control unit 250 can rotate the graphic object disposed in the periphery of the specified graphic object around the specified graphic object according to the received slide path (Operation S970).

That is, the graphic object control unit 250 performs the control of the three-dimensional motion of the graphic object according to the detected button input or the slide path. Here, the three-dimensional motion includes the rotation of the graphic object according to the slide path when the touch of the user on the touch pad 210 is released, the rotation of the graphic object according to the slide path between the two zones corresponding to the two directions by one axis among the zones of the touch pad 210, and the movement of the graphic object touch pad 210 according to the button input.

When a plurality of displayed graphic objects exist, the three-dimensional motion includes the rotation of the graphic object disposed in the periphery of the specified graphic object around the specified graphic object according to the slide path when the touch of the user on the touch pad 210 is released, the rotation of the graphic object disposed in the periphery of the specified graphic object around the specified graphic object according to the slide path between the two zones corresponding to the two directions by one axis among the zones of the touch pad 210, and the movement of the focus among the plurality of graphic objects according to the button input.

The graphic object that is moved and rotated by the graphic object control unit 250 is displayed through the display unit 260 (Operation S980).

According to the apparatus and method of controlling a three-dimensional motion of a graphic object of the exemplary embodiments of the present invention described above, the following effects may be obtained.

First, the movement and rotation of the displayed three-dimensional graphic object touch pad is controlled using the user input, such as a click or slide of the touch pad, and thus convenience of the user can be promoted.

Second, the existing touch pad is used as the input unit, and thus manufacturing costs can be reduced.

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects.

What is claimed is:

1. An apparatus for controlling three-dimensional motion of a graphic object, the apparatus comprising:
a touch pad which receives a user input by a touch;
a position determining unit which determines a touch position of the user input on the touch pad and a touch release position;
a path detecting unit which detects a slide path based on the touch position and touch release position determined by the position determining unit; and
a graphic object control unit which controls the three-dimensional motion of the graphic object according to the slide path detected by the path detecting unit,
wherein the touch pad is divided into six zones corresponding to six directions along three-dimensional axes, and
wherein the three-dimensional motion comprises a rotation of the graphic object around an axis according to the slide path between two zones among the six zones corresponding to two directions along one axis.

2. The apparatus of claim 1, wherein the three-dimensional motion comprises a rotation of the graphic object according to the slide path if the touch is released.

3. The apparatus of claim 1, wherein the three-dimensional motion comprises a rotation of a graphic object disposed near a specified graphic object according to the slide path when the touch is released.

4. The apparatus of claim 2, wherein the slide path comprises at least one of a linear path and a curved path.

5. The apparatus of claim 1, wherein the slide path comprises at least one of a linear path and a curved path.

6. The apparatus of claim 1, further comprising a button input detecting unit which detects a button input generated by a touch release after the touch is made in a specified zone of the six zones.

7. The apparatus of claim 6, wherein the three-dimensional motion comprises a movement of the graphic object according to the button input.

8. The apparatus of claim 6, wherein, if a plurality of graphic objects exist, the three-dimensional motion comprises a movement of a focus of the plurality of graphic objects according to the button input.

9. The apparatus of claim 1, further comprising a display unit which displays the graphic object.

10. The apparatus of claim 1, wherein the slide path begins at the touch position and ends at the touch release position.

11. The apparatus of claim 1, wherein if the slide path is in an x-direction, the graphic object rotates around a y-axis, if the slide path is in a y-direction, the graphic object rotates around an x-axis, and if the slide path is in a circular direction, the graphic object rotates around a z-axis.

12. A method of controlling a three-dimensional motion of a graphic object implemented by an apparatus for controlling the three-dimensional motion of a graphic object comprising a touch pad and a processor having computing device-executable instructions, the method comprising:
receiving, by the touch pad, a user input by a touch;
determining a touch position and a touch release position of the user input;
detecting, by the processor, a slide path based on the touch position and touch release position; and
controlling a three-dimensional motion of the graphic object according to the slide path,
wherein the touch pad is divided into six zones corresponding to six directions along three-dimensional axes, and
wherein the three-dimensional motion comprises a rotation of the graphic object according to the slide path between two zones among the six zones corresponding to two directions along one axis.

13. The method of claim 12, wherein the three-dimensional motion comprises a rotation of the graphic object according to the slide path when the touch is released.

14. The method of claim 12, wherein the three-dimensional motion comprises a rotation of a graphic object disposed near a specified graphic object according to the slide path when the touch is released.

15. The method of claim 13, wherein the slide path comprises at least one of a linear path and a curved path.

16. The method of claim 12, wherein the slide path comprises at least one of a linear path and a curved path.

17. The method of claim 12, further comprising detecting a button input generated by a touch release after the touch is made in a specified zone of the six zones.

18. The method of claim 17, wherein the three-dimensional motion comprises a movement of the graphic object according to the button input.

19. The method of claim 17, wherein, if a plurality of graphic objects exist, the three-dimensional motion comprises a movement of a focus of the plurality of graphic objects according to the button input.

20. The method of claim 12, further comprising displaying the graphic object.

21. The method of claim 12, wherein the slide path begins at the touch position and ends at the touch release position.

22. The method of claim 12, wherein if the slide path is in an x-direction, the graphic object rotates around a y-axis, if the slide path is in a y-direction, the graphic object rotates around an x-axis, and if the slide path is in a circular direction, the graphic object rotates around a z-axis.

* * * * *